United States Patent [19]
Hsieh et al.

[11] Patent Number: 5,951,037
[45] Date of Patent: Sep. 14, 1999

[54] LUGGAGE CART

[76] Inventors: Hung-Ching Hsieh; Yung-Shun Hsieh, both of No. 15, Lane 493, Sec 2, Yuan-Chi Rd., Yuan-Lin, Chang-Hua Hsien, Taiwan

[21] Appl. No.: 08/956,625

[22] Filed: Aug. 7, 1997

[51] Int. Cl.⁶ .................................................... B62B 1/00
[52] U.S. Cl. ........................................ 280/655; 280/47.29
[58] Field of Search .................................. 280/638, 639, 280/652, 655, 655.1, 47.18, 47.24, 47.27, 47.28, 47.29

[56] References Cited

U.S. PATENT DOCUMENTS

| | | | |
|---|---|---|---|
| 4,917,401 | 4/1990 | Iwaki | 280/655 |
| 5,127,664 | 7/1992 | Cheng | 280/655 |
| 5,351,984 | 10/1994 | Cheng | 280/655 |
| 5,374,073 | 12/1994 | Hung-Hsin | 280/655 |
| 5,549,318 | 8/1996 | Ho | 280/654 |
| 5,590,897 | 1/1997 | Tsai | 280/655 |
| 5,639,109 | 6/1997 | Liang | 280/655 |
| 5,678,843 | 10/1997 | Liu | 280/655 |
| 5,692,266 | 12/1997 | Tsai | 280/655 |
| 5,797,617 | 8/1998 | Lin | 280/655 |
| 5,864,921 | 2/1999 | Chou | 280/655 |
| 5,884,362 | 3/1999 | Tsai | 280/655 |

*Primary Examiner*—Richard Camby
*Assistant Examiner*—Jeff Restifo
*Attorney, Agent, or Firm*—Erik M. Arnhem

[57] ABSTRACT

A luggage cart which mainly includes a handle assembly, a vertical telescopic frame assembly, a movable upper crossbar assembly, a fixed crossbar, a luggage support, a foot-control assembly, a horizontal telescopic frame assembly, and an upper and a lower fixing members for mounting onto a back side of a trunk. The handle assembly has a long pull rod provided therein for controlling the sliding of pipes of the vertical telescopic frame assembly. The movable upper crossbar assembly may be adjusted in height to associate with the upper fixing member and the foot-control assembly may be associated with said lower fixing member. Whereby when the trunk is loaded on the luggage support and the horizontal telescopic frame assembly with the upper and the lower fixing members respectively associated with the upper crossbar assembly and the foot-control assembly, the trunk can be carried with the cart in a laborsaving manner. When the luggage cart is not in use, it can be folded to a small volume for convenient storage.

10 Claims, 9 Drawing Sheets

LUGGAGE CART

BACKGROUND OF THE INVENTION

A traveller uses trunks, suitcases, or different bags to load his or her clothing and other personal articles. These trunks, suitcases or bags shall become very heavy when they are fully loaded and are therefore, not easy to carry with hands, particularly during a long-distance travel. These heavy luggages become a burden of the traveller and largely decrease the pleasure of travel.

It is therefore tried by the inventor to develop a luggage cart which can be conveniently used to carry heavy luggages effortlessly and can be folded to a minimum volume for storage when it is not in use.

SUMMARY OF THE INVENTION

The luggage cart according to the present invention mainly includes a handle assembly, a vertical telescopic frame assembly, a movable upper crossbar assembly, a fixed crossbar, a luggage support, a foot-control assembly, a horizontal telescopic frame assembly, and an upper and a lower fixing members for mounting onto a back side of a trunk. The handle assembly has a long pull rod provided therein for controlling the sliding of pipes of the vertical telescopic frame assembly. The movable upper crossbar assembly may be adjusted in height to associate with the upper fixing member and the foot-control assembly may be associated with said lower fixing member. Whereby when the trunk is loaded on the luggage support and the horizontal telescopic frame assembly with the upper and the lower fixing members respectively associated with the upper crossbar assembly and the foot-control assembly, the trunk can be carried with the cart in a laborsaving manner. When the luggage cart is not in use, it can be folded to a small volume for convenient storage.

DETAILED DESCRIPTION OF THE PREFERRED EMBODIMENTS

Figure 1:
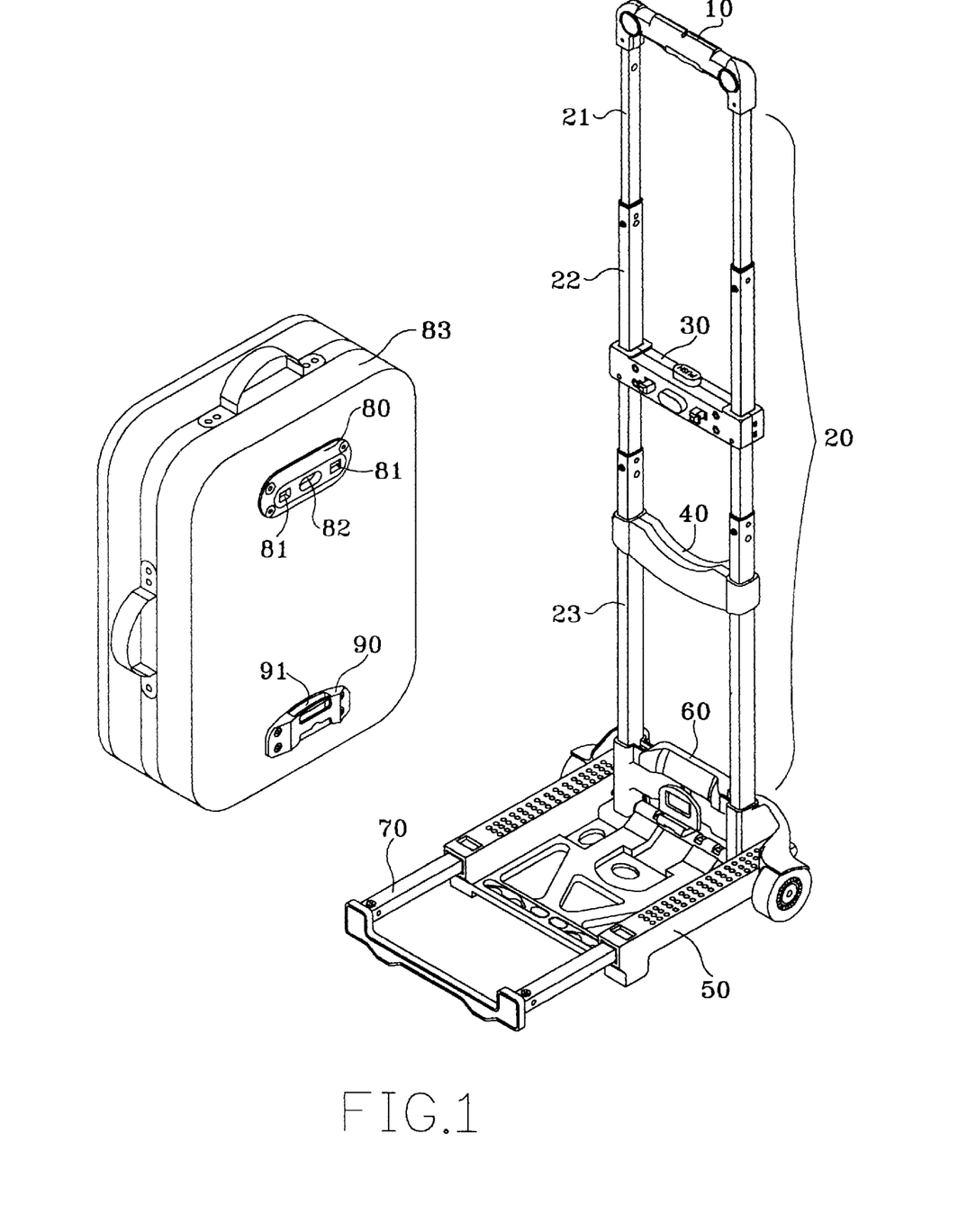
FIG. 1 is a perspective showing a luggage cart according to the present invention in a fully unfolded state and a trunk having the fixing members of the present invention attached thereto.
Figure 2:
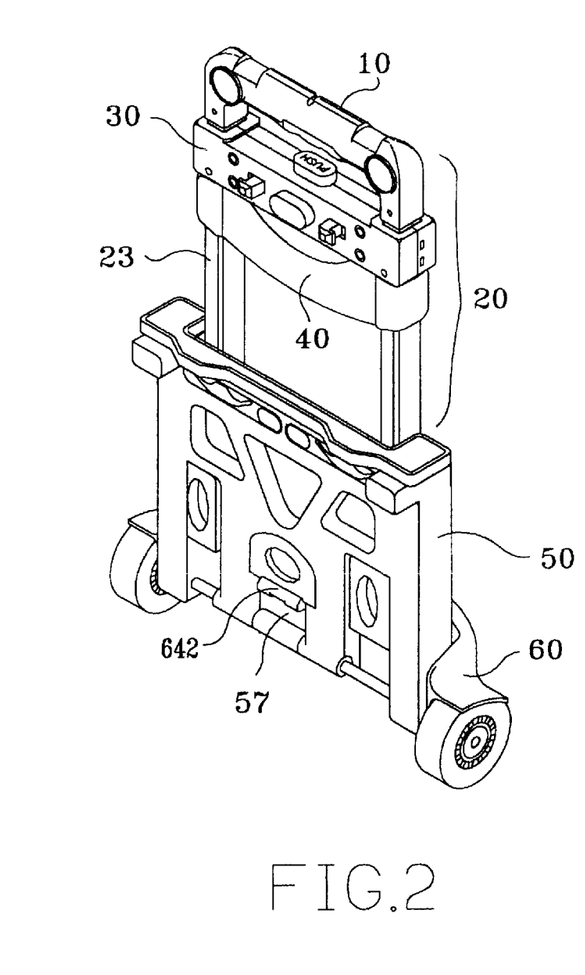
FIG. 2 is a perspective showing the luggage cart of the present invention in a fully folded state.
Figure 3:
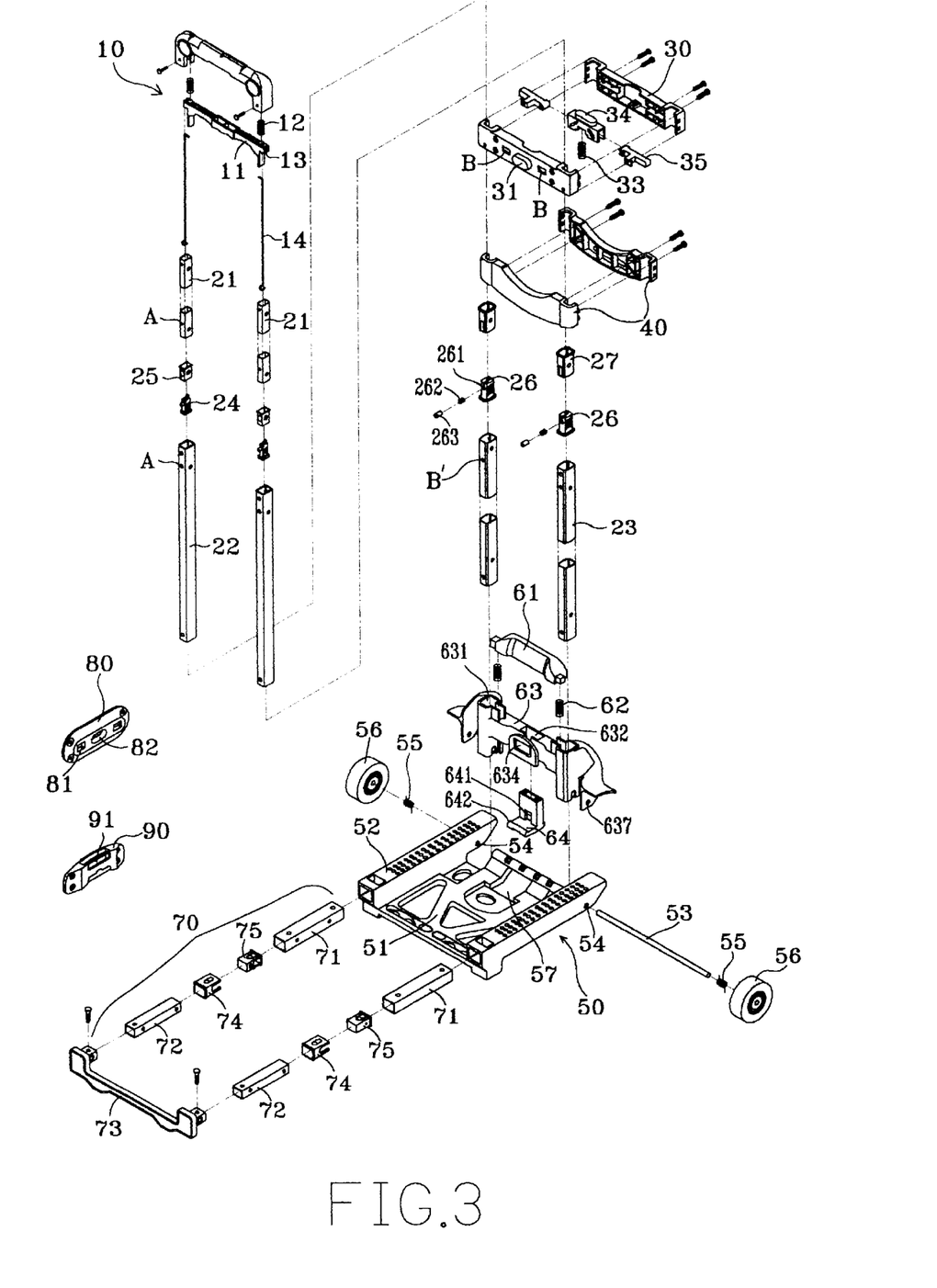
FIG. 3 is an exploded perspective of the luggage cart and the fixing members of the present invention.

Please refer to FIGS. 1, 2 and 3, the present invention relates to a luggage cart which mainly includes a handle assembly 10, a vertical telescopic frame assembly 20, a vertically slidable upper crossbar assembly 30, a fixed crossbar 40, a luggage support 50, a foot-control assembly 60, a horizontal telescopic frame assembly 70, and an upper fixing member 80 and a lower fixing member 90 for mounting onto a trunk 83.

FIG. 1 shows the luggage cart of the present invention with the vertical telescopic frame assembly 20, the luggage support 50, and the horizontal telescopic frame assembly 70 in a fully unfolded state, so that the trunk 83 may be loaded on the luggage support 50 and the extended horizontal telescopic frame assembly 70 of the cart to be easily move around. FIG. 2 shows the luggage cart of FIG. 1 with the telescopic frame assembly 20, the luggage support 50, and the horizontal telescopic frame assembly 70 in a fully folded state, so that the whole folded cart can be carried with a hand or be stored without occupying too much space. As shown in FIG. 1, the upper fixing member 80 and the lower fixing member 90 are separately riveted to an upper and a lower portion of an outer back surface of the trunk 83. The upper fixing member 80 is formed near two ends with two insertion holes 81 and at a center with a locating hole 82.

Please refer to FIGS. 1, 3, 4, and 5 at the same time for an internal structure of the handle assembly 10 of the luggage cart. The handle assembly 10 includes an elongated pull bar 11 located below a top housing of the handle assembly 10. Two compression springs 12 are separately disposed between tops of two outer ends of the pull bar 11 and the top housing, so that the long pull bar 11 can be pulled upward relative to the top housing. The long pull bar 11 is formed at two end surfaces with two vertically extended grooves 13 for two connecting rods 14 to separately hook thereto at their upper ends.

The vertical telescopic frame assembly 20 includes from top to bottom a pair of inner pipes 21, a pair of middle pipes 22, and a pair of outer pipes 23. The inner pipes 21 are slidably received in the middle pipes 22, and the middle pipes 22 are slidably received in the outer pipes 23.

Figure 4:
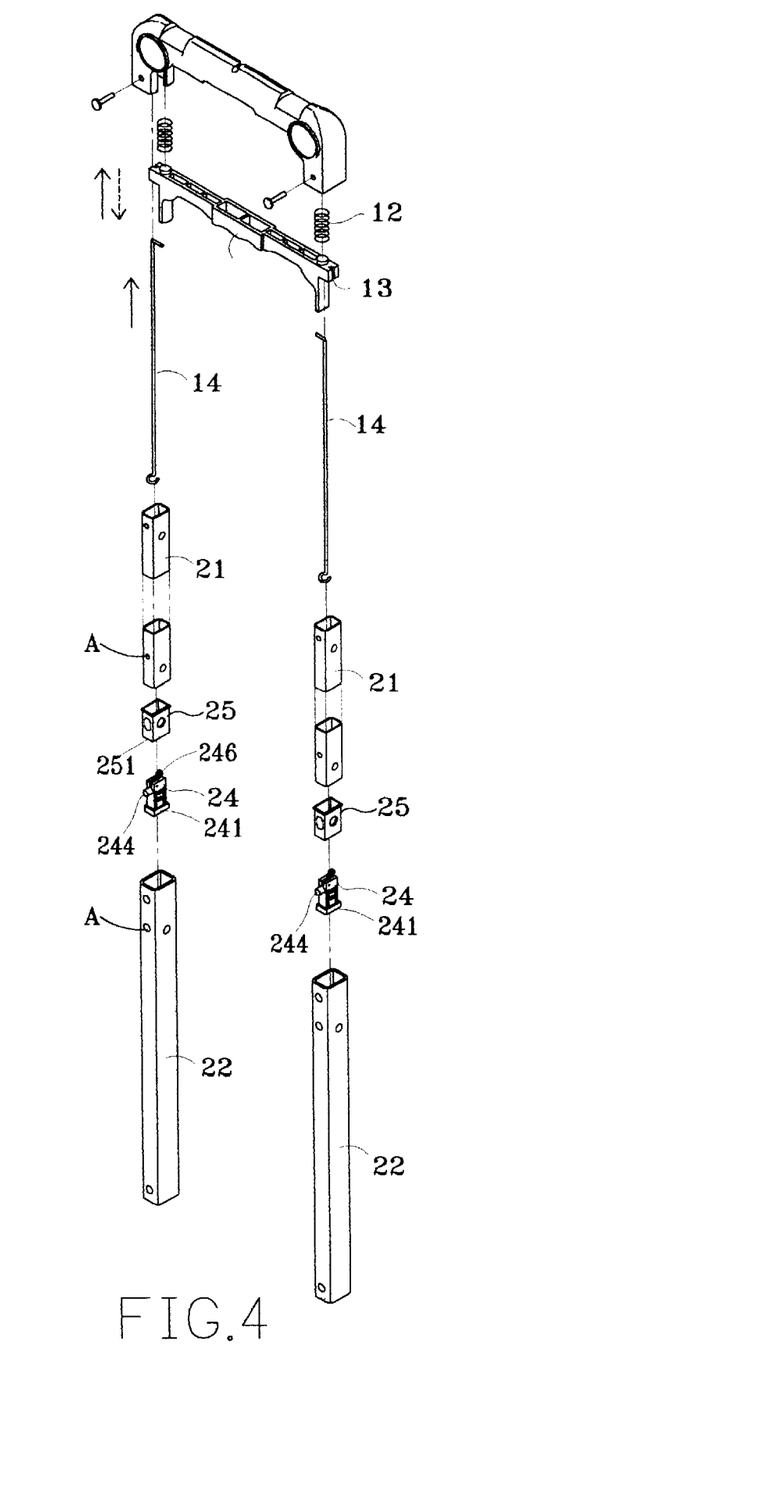
FIG. 4 is an enlarged exploded perspective of the handle assembly and the inner and the middle pipes of the vertical telescopic frame assembly of the present invention.

The inner pipe 21 each has a first retaining member 24 inserted into a lower end thereof. The middle pipe 22 each has a middle pipe insert 25 mounted to an upper inner end thereof. When the inner pipe 21 is pulled upward inside the middle pipe 22, a lower flange 241 of the first retaining member 24 shall abut against a lower periphery 251 of the middle pipe insert 25, preventing the inner pipe 21 from being pulled any further to separate from the middle pipe 22.

Figure 5:
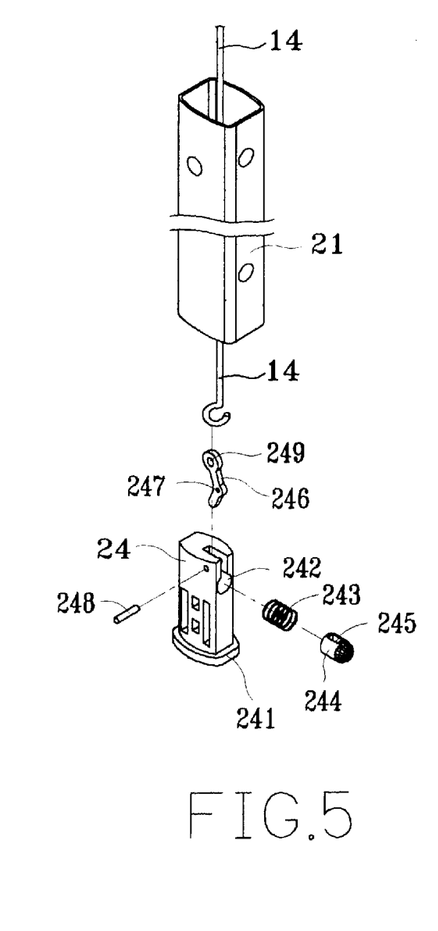
FIG. 5 is a further enlarged exploded perspective of the first retaining member of the vertical telescopic frame assembly of the present invention.

As can be more clearly seen from FIGS. 4 and 5, the first retaining member 24 is provided with a guiding groove 242 for accommodating a compression spring 243 and an insertion pin 244 therein. The insertion pin 244 has a slot 245 to accommodate a lower end of a bent retaining arm 246. The above-mentioned connecting rod 14 which each is connected at an upper end to one end groove of the long pull bar 11 of the handle assembly 10 extends through the inner pipe 21 to have its lower end hooked to a hooking hole 249 formed on the bent retaining arm 246. The bent retaining arm 246 is pivotally connected to the first retaining member 24 by a shaft 248 extending through a shaft hole 247 on the bent retaining arm 246, so that the bent retaining arm 246 can swing inward and outward relative to the first retaining member 24. The insertion pin 244 is normally pushed outward by the compression spring 243, so that the insertion pin 244 projects into insertion holes A formed on the inner pipe 21 and the middle pipe 22, allowing the inner pipe 21 to fixedly connect to the middle pipe 22 without sliding in the middle pipe 22. However, when the connecting rod 14 is pulled upward, it shall pull the bent retaining arm 246 hooked to the lower end of the connecting rod 14 to swing inward and forces the insertion pin 244 to move inward and disengage from the insertion holes A on the inner and the middle pipes 21, 22. At this point, the inner pipe 21 is allowed to freely slide upward or downward in the middle pipe 22.

Figure 15:
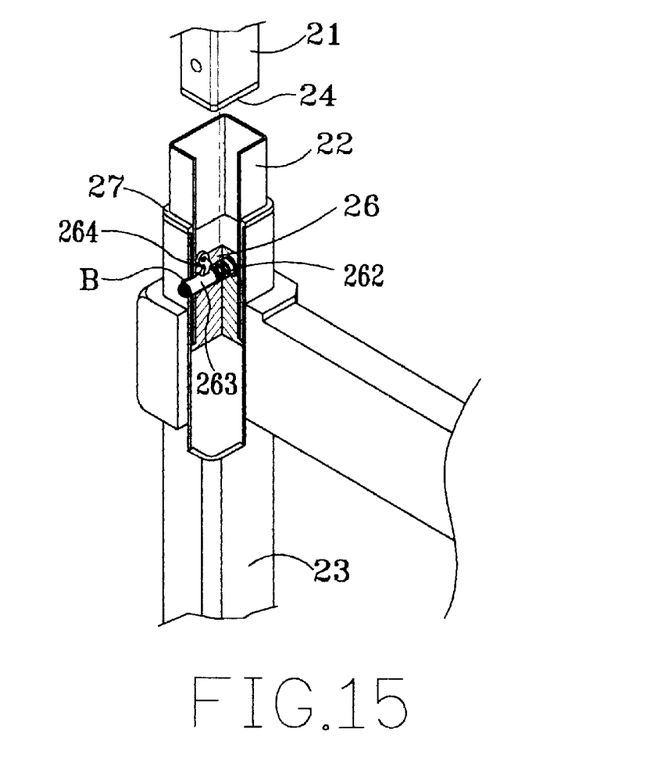
FIG. 15 is an enlarged, fragmentary perspective showing the second retaining member associated with the outer pipe of the vertical telescopic frame assembly of the present invention, wherein a part thereof is cut away to better show the internal structure thereof.

As can be seen from FIGS. 1, 3, and 15, the middle pipe 22 each has a second retaining member 26 inserted into a lower end thereof, and the outer pipe 23 each has an outer pipe insert 27 mounted to an upper inner end thereof. The second retaining member 26 has a structure and operation manner identical to that of the first retaining member 24 as shown in FIG. 5. Please particularly refer to FIG. 15 now. When the inner pipe 21 is slided into the middle pipe 22, the first retaining member 24 at the lower end of the inner pipe 21 will press against and contact with a bent retaining arm 264 of the second retaining member 26 of the middle pipe 22, causing the bent retaining arm 264 to swing inward relative to the second retaining member 26, forcing a compression spring 262 and an insertion pin 263 to move inward along a guiding groove 261 of the second retaining member 26 and causing the insertion pin 263 to disengage from insertion holes B' formed on the outer pipe 23. At this point, the middle pipe 22 is allowed to freely slide upward or downward in the outer pipe 23.

As shown in FIGS. 1, 3, 6, and 7, the upper crossbar assembly 30 is allowed to vertically slide along the two middle pipes 22, so that the upper crossbar assembly 30 can be adjusted to a height on the middle pipes 22 corresponding to the upper fixing member 80 mounted onto a back side of the trunk 83. The upper crossbar assembly 30 includes two symmetrically formed housing members. A first housing member is formed at a central area with a projected locating block 31 and at two sides of the locating block 31 with two symmetrical side openings B. The two side openings B are so spaced that they correspond to the two insertion holes 81 formed on the upper fixing member 80 and the projected locating block 31 corresponds to the locating hole 82 of the upper fixing member 80.

Figure 6:
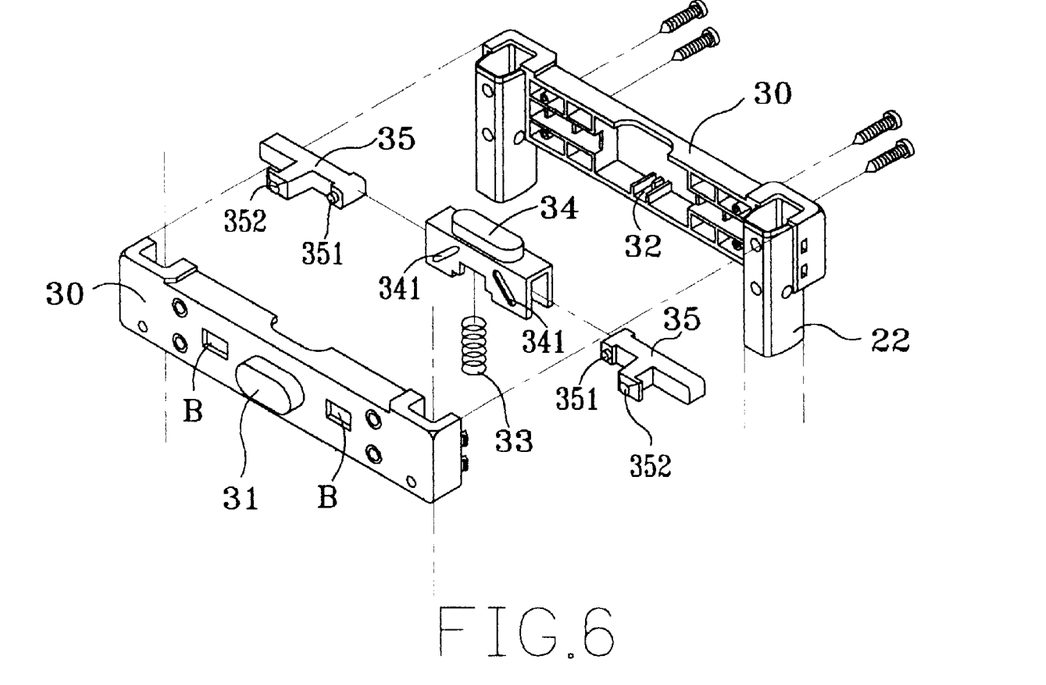
FIG. 6 is an exploded perspective of the upper crossbar of the present invention.

A guide channel 32 is provided inside the upper crossbar assembly 30 for a compression spring 33 to locate therein. An operation push button 34 is provided above the compression spring 33, such that the push button 34 can contact with the compression spring 33 to depress the latter. The push button 34 includes two side walls on each of which two opposite outward and downward inclined long holes 341 are formed. Two links 35 are disposed at two ends of the push button 34, such that two lugs 351 symmetrically and sideward projecting from an inner end of each link 35 are located in the long holes 341 and can move reciprocatingly in the long holes 341. A hook projection 352 is provided at one side of each link 35 to extend through and beyond the side opening B.

Figure 7:
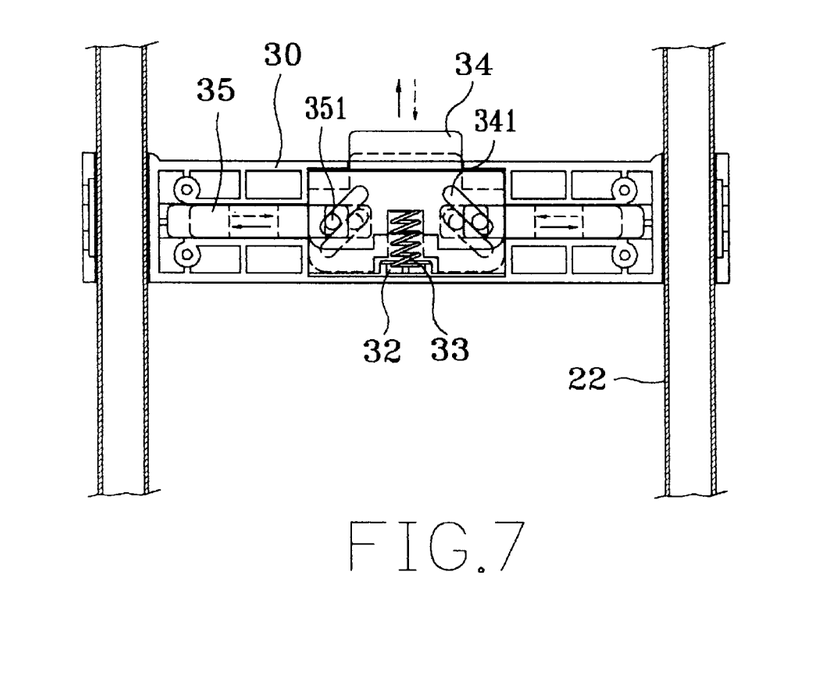
FIG. 7 illustrates the manner in which the upper crossbar of the present invention is operated.
Figure 8:
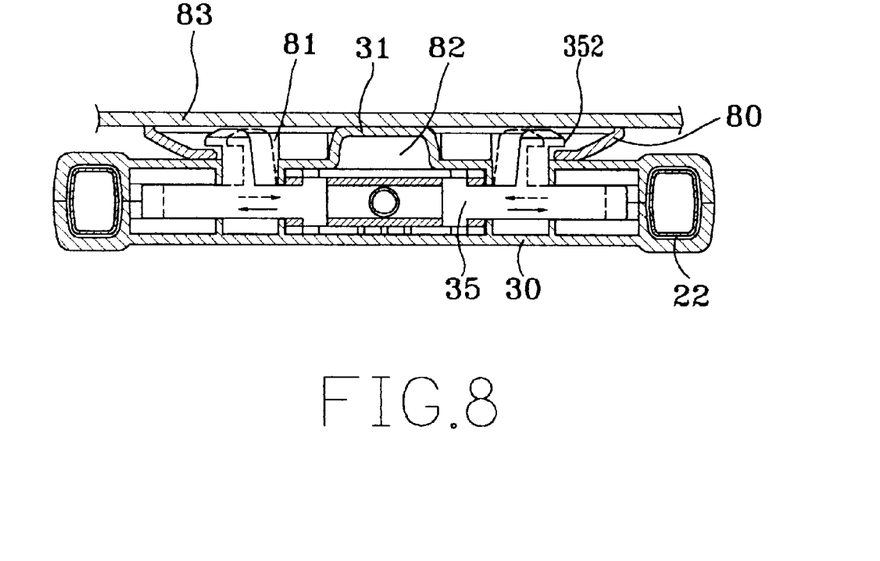
FIG. 8 illustrates the manner in which the upper crossbar and the upper fixing member of the present invention are associated with one another.

Please refer to FIGS. 1, 7 and 8 at the same time. To associate the upper crossbar assembly 30 with the fixing member 80 riveted onto the trunk 83, first get the locating block 31 in alignment with and inserted into the locating hole 82 of the upper fixing member 80. Meanwhile, depress the operation push button 34 so that the lugs 351 are guided by the inclined long holes 341 to shift inward, causing the hook projections 352 to move inward along the side openings B and extend into the side openings 81 of the upper fixing member 80, so that the upper fixing member 80 is associated with the upper crossbar assembly 30.

Figure 9:
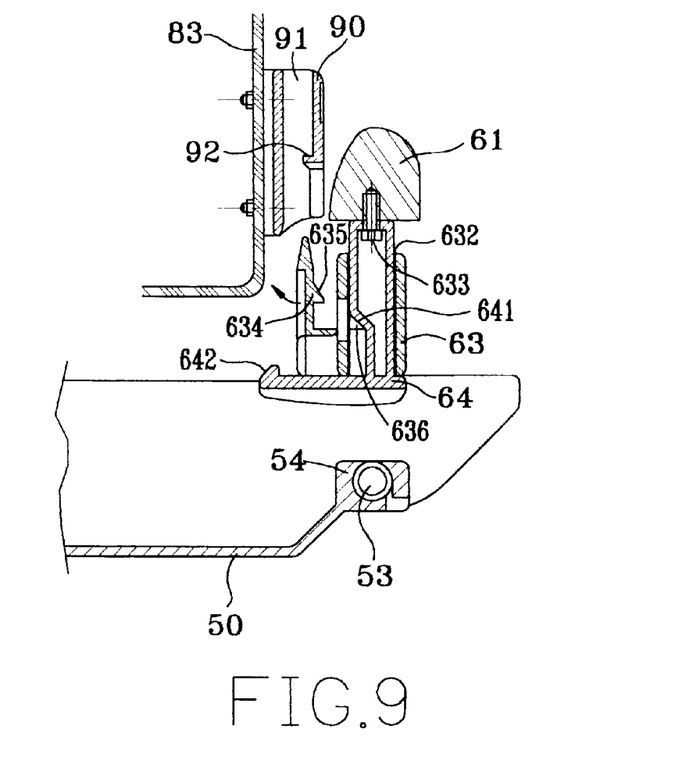
FIGS. 9, 10 and 11 illustrate the manner in which the lower fixing member and the foot-control assembly of the present invention are associated with one another.

Please refer to FIGS. 1, 3 and 9 for the structures of the luggage support 50 and the foot-control assembly 60. The luggage support 50 includes a platform 51 which has a central recess portion and two symmetrical hollow pipes 52 raised from two lateral sides of the platform 51 for receiving the horizontal telescopic frame assembly 70 therein.

The foot-control assembly 60 includes a pedal 61, a pair of springs 62, a seat 63, and an L-shaped member 64. An vertical portion of the L-shaped member 64 is upward inserted in a middle insertion hole 632 of the seat 63 and is fixedly connected to the pedal 61 above the seat 63 by means of a screw 633 threading into the pedal 61, such that when the pedal 61 is stepped down, the L-shaped member 64 is moved downward at the same time, and when the pedal 61 is released, the pedal 61 and the L-shaped member 64 shall return to their higher positions due to a spring force of the pair of springs 62. A movable L-shaped plate 634 is provided to one side surface of the seat 63. The movable L-shaped plate 634 is formed at an inner surface with a retaining block 635 and at a bottom edge with a bevelled sliding block 636. The retaining block 635 corresponds to a projected block 92 formed on an inner wall surface of an insertion space 91 of the lower fixing member 90, and the bevelled sliding block 636 corresponds to a bevelled sliding channel 641 formed on a wall surface of the L-shaped member 64.

As shown in the figures, the luggage support 50 and the foot-control assembly 60 are assembled together by extending a pivotal shaft 53 through shaft holes 54 formed on the luggage support 50 and shaft holes 637 formed on the seat 63. Then, two torsional springs 55 and two wheels 56 are mounted to two outer ends of the pivotal shaft 53 to complete the assembling of the vertical telescopic frame assembly 20, the foot-control assembly 60, and the luggage support 50.

Figure 10:
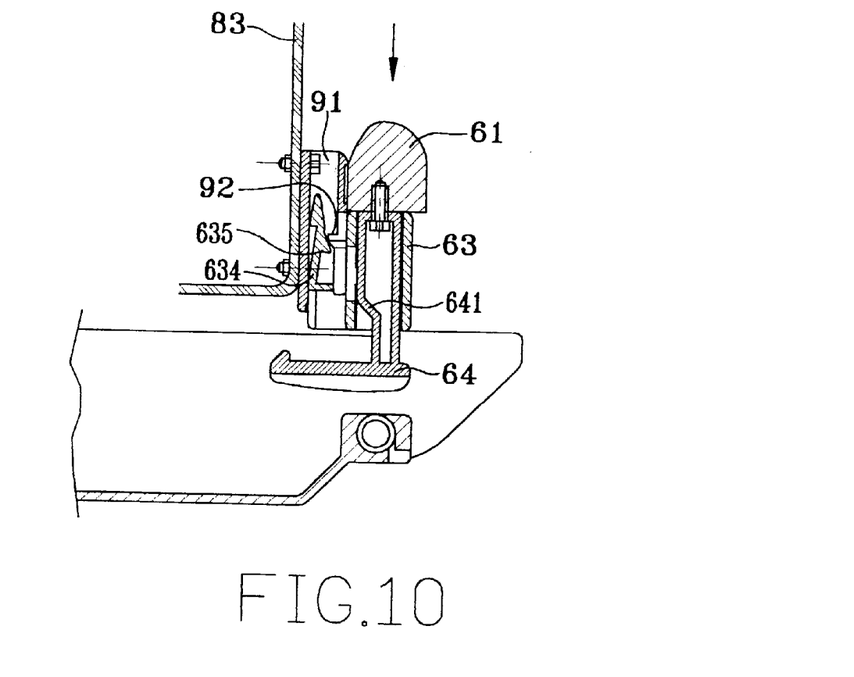
Figure 11:
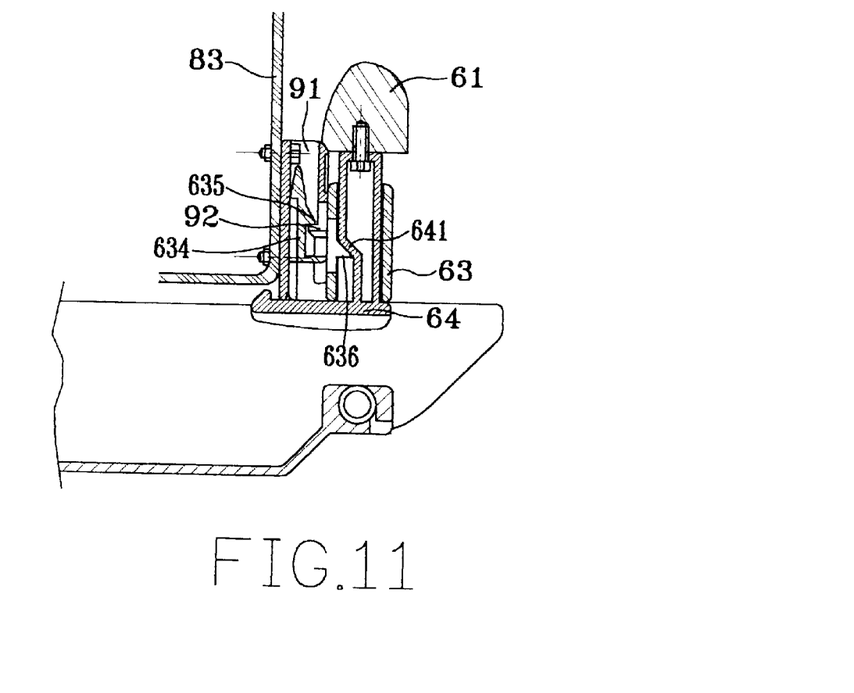

Please refer to FIGS. 10 and 11. When the trunk 83 is loaded on the luggage support 50 and is to be associated with the vertical telescopic frame assembly 20, first get the insertion space 91 of the lower fixing member 90 on the trunk 83 in alignment with and engaged into the L-shaped plate 634 provided to one side surface of the seat 63. At this point, the projected block 92 of the lower fixing member 90 and the retaining block 635 of the L-shaped plate 634 abut against one another to locate the trunk 83 in place. And, to disengage the lower fixing member 90 from the telescopic frame assembly 20, simply step down the pedal 61 to cause the L-shaped member 64 to move downward at the same time. At this point, the bevelled sliding block 636 of the L-shaped plate 634 shall disengage from the bevelled sliding channel 641 of the L-shaped member 64, and the retaining block 635 of the L-shaped plate 634 shall simultaneously disengage from the projected block 92 of the lower fixing member 90, allowing the lower fixing member 90 to separate from the L-shaped plate 634.

As shown in FIG. 3, the L-shaped member 64 is provided at a front edge with a hook portion 642. When the luggage support 50 is folded toward the telescopic frame assembly 20 as shown in FIG. 2, the hook portion 642 shall engage into a retaining hole 57 formed at a rear portion of the luggage support 50, so that the folded luggage support 50 and the telescopic frame assembly 20 are not easily separated from one another. To unfold the luggage support 50 for use as shown in FIG. 1, simply step down the pedal 61 to move the L-shaped member 64 downward, and the luggage support 50 can be separated from the telescopic frame assembly 20.

Figure 12:
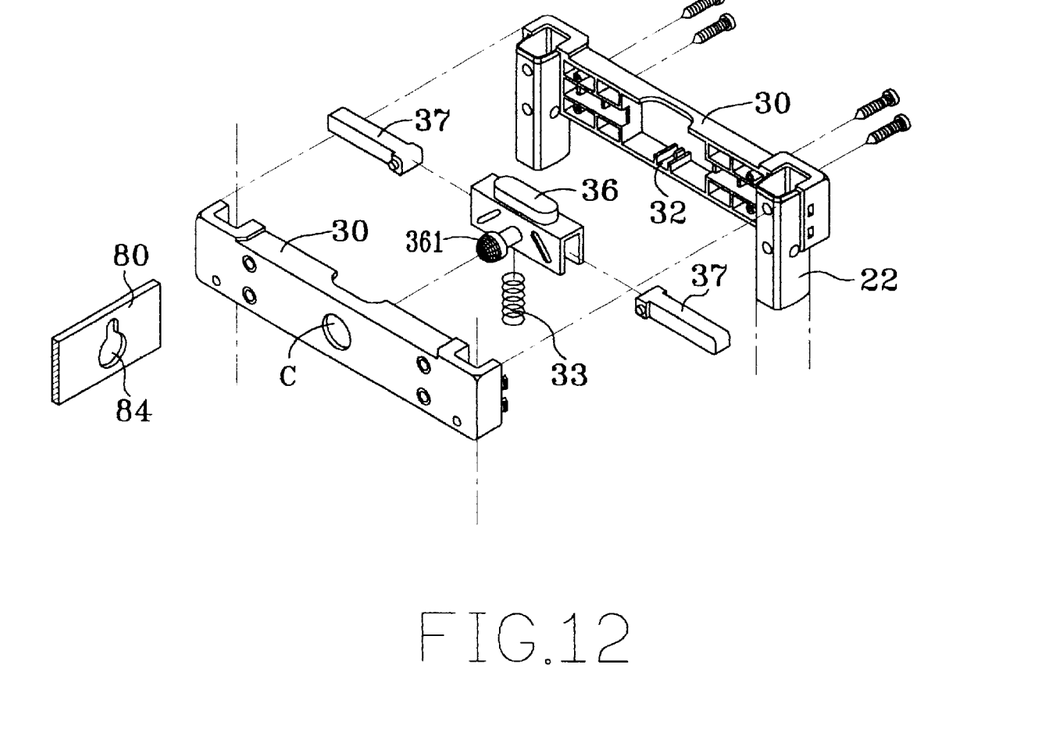
FIG. 12 is an exploded perspective of a second embodiment of the upper crossbar and the upper fixing member.
Figure 13:
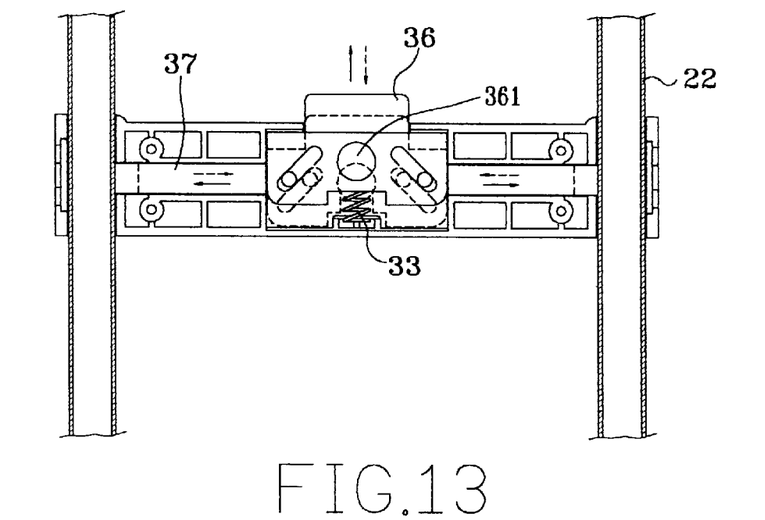
FIG. 13 illustrates the manner in which the second embodiment of the upper crossbar shown in FIG. 12 is operated.
Figure 14:
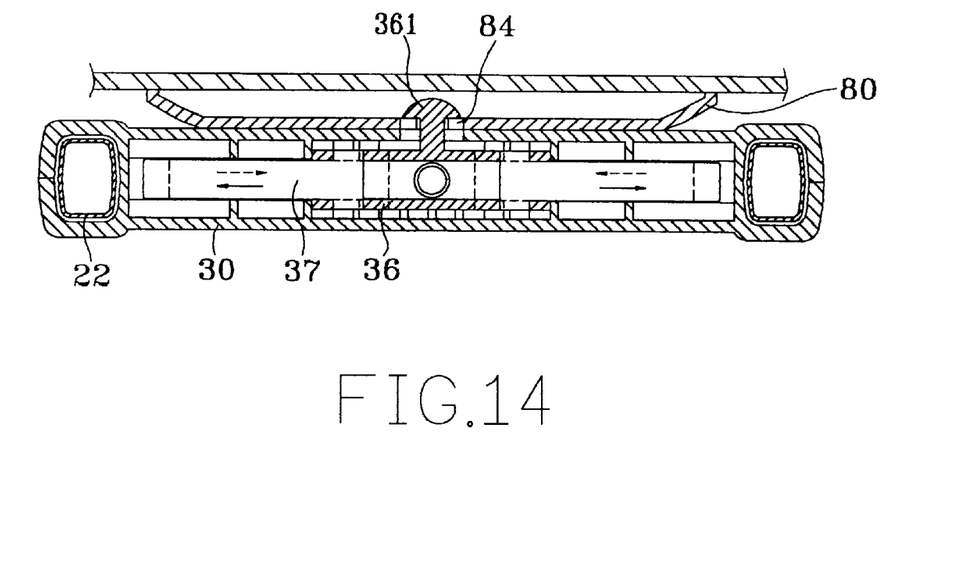
FIG. 14 illustrates the manner in which the second embodiment of the upper crossbar and the upper fixing member shown in FIG. 12 are associated with one another.

FIGS. 12, 13 and 14 illustrate a second embodiment of the upper crossbar assembly 30 and the corresponding upper fixing member 80. In this embodiment, the upper fixing member 80 is formed of a central insertion hole 84 which includes a narrow upper portion and an expanded lower portion, and the upper crossbar assembly 30 includes two symmetrical housing members. One of the housing members is formed at a side surface with an opening C corresponding to the central insertion hole 84 of the upper fixing member 80. The upper crossbar assembly 30 of the second embodiment also includes an inner guide groove 32 in which a compression spring 33 is disposed. The upper crossbar assembly 30 of the second embodiment also includes an operation push button 36 disposed above the compression spring 33. Two links 37 are connected to two outer ends of the operation push button 36. An insertion button 361 projects from a central portion of a side wall of the operation push button 36, so that the insertion button 361 shall extend through and beyond the insertion hole C on one housing member of the upper crossbar assembly 30. When the operation push button 36 is depressed, the insertion button 361 shall be in alignment with the expanded lower portion of the insertion hole 84 on the upper fixing member 80 and can be directly inserted into the insertion hole 84. When the push button 36 is released, the compression spring 33 shall push the push button 36 upward and therefore brings the insertion button 361 to move upward into the narrow upper portion of the insertion hole 84, causing the upper crossbar assembly 30 to firmly associate with the upper fixing member 80.

As shown in FIGS. 1 and 3, the horizontal telescopic frame assembly 70 includes a pair of outer pipes 71, a pair of inner pipes 72, and a transverse plate 73. The outer pipes 71 are separately fixedly received in the two raised hollow pipes 52 of the luggage support 50. The inner pipes 72 are slidably received in the two outer pipes 71. The outer pipe 71 each has an outer pipe insert 74 connected to a front inneer end of the outer pipe 71, and the inner pipe 72 each has an inner pipe insert 75 connected to a rear inner end of the inner pipe 72.

While the present invention is described with a trunk 83 as the luggage to be loaded on the present invention, it is to be understood that other types of bags, satchels, baskets, and containers all can be mounted with the upper and the lower fixing members 80 and 90, respectively, of the present invention and therefore be stably carried on the luggage cart of the present invention for easily moving around.

What is claimed is:

1. A luggage cart comprising:
   a handle assembly including a top housing, an elongated pull bar located below said top housing, and two compression springs separately disposed between tops of two outer ends of said pull bar and said top housing; said long pull bar being formed at two end surfaces with two vertically extended grooves;
   a vertical telescopic frame assembly including from top to bottom a pair of inner pipes, a pair of middle pipes, and a pair of outer pipes, said inner pipes being slidably received in said middle pipes, said middle pipes being slidably received in said outer pipes, and said outer pipes having two lower ends inserted into two side holes formed on a foot-control assembly of said luggage cart;
   an upper crossbar assembly being vertically slidable along said middle pipes and including two symmetrically formed housing members, one of said two housing members being formed at a central area with a projected locating block and at two sides of said locating block with two symmetrical side openings;
   a fixed crossbar;
   a luggage support including a platform which has a central recess portion and two symmetrical hollow pipes raised from two lateral asides of said platform;
   a foot-control assembly including a pedal, a pair of springs, a seat, and an L-shaped member, a vertical portion of said L-shaped member being upward inserted into an insertion hole of said seat and being fixedly fastened to said pedal above said seat by means of a screw;
   a horizontal telescopic frame assembly including a pair of outer pipes, a pair of inner pipes, and a transverse plate, said outer pipes being fixedly received in said two raised hollow pipes of said luggage support, and said inner pipes being slidably received in said outer pipes of said horizontal telescopic frame assembly;
   an upper fixing member being fixedly mounted onto a back surface of a luggage to be carried by said luggage cart, said upper fixing member being formed near two ends with two insertion holes and at a center with a locating hole; and
   a lower fixing member being fixedly mounted onto a back surface of said luggage below said upper fixing member, said lower fixing member defining a central insertion space and at an inner wall surface of said insertion space with a projected block;
   whereby said luggage cart may be used to carry various types of luggages in different dimensions in a labor-saving manner, and said luggage cart can be folded to a small volume for storage when it is not in use.

2. A luggage cart as claimed in claim 1, wherein said inner pipes and said middle pipes of said vertical telescopic frame assembly all have a retaining member connected to their respective lower inner ends, said retaining member each being provided with a guide groove for accommodating a compression spring and an insertion pin therein, and said insertion pin being provided with a slot for a lower end of a bent retaining arm of said retaining member to extend thereinto.

3. A luggage cart as claimed in claim 2, wherein said inner pipes of said vertical telescopic frame assembly respectively have a connecting rod extending through said inner pipes, said connecting rod each having an upper end hooked to one of said vertically extended grooves formed on said long pull bar of said handle assembly and a lower end hooked to a hooking hole formed on each said bent retaining arm of said retaining member.

4. A luggage cart as claimed in claim 1, wherein said upper crossbar assembly is provided at an inner side with a guide groove for a compression spring to dispose therein, and an operation push button being provided over said compression spring, and said operation push button being formed at each side wall with two outward and downward inclined holes opposite to one another.

5. A luggage cart as claimed in claim 4, wherein said inclined holes on said operation push button of said upper crossbar assembly have received therein lugs laterally projected from one end of two links, said links being provided at one side surface each with a hook projection which extends through and beyond one of said side openings formed on said upper crossbar assembly.

6. A luggage cart as claimed in claim 1, wherein said upper crossbar assembly includes two symmetrically formed housing members, and one of said two housing members being formed on a side wall at a central portion with one single opening.

7. A luggage cart as claimed in claim 4, wherein said operation push button of said upper crossbar assembly is provided on one side wall at a central area with a projected insertion button which extends through and beyond said opening centered on one side wall of one said housing member of said upper crossbar assembly.

8. A luggage cart as claimed in claim 1, wherein said seat of said foot-control assembly is provided on one side surface with a movable L-shaped plate, said movable L-shaped plate being formed at an inner surface with a retaining block corresponding to said projected block of said lower fixing member and at a bottom edge with a bevelled sliding block corresponding to a bevelled sliding channel formed on a wall surface of said L-shaped member.

9. A luggage cart as claimed in claim 1, wherein said L-shaped member of said foot-control assembly is provided at a front edge with a hook portion for engaging into a retaining hole formed at a rear portion of said luggage support.

10. A luggage cart as claimed in claim 1, wherein said upper fixing member is formed at a central area with an insertion hole which includes a narrow upper portion and an expanded lower portion.

* * * * *